Dec. 16, 1941.    B. FITZGERALD    2,266,187
DEVICE FOR AIR CONDITIONING AUTOMOTIVE VEHICLES
Filed Jan. 29, 1940    2 Sheets-Sheet 2
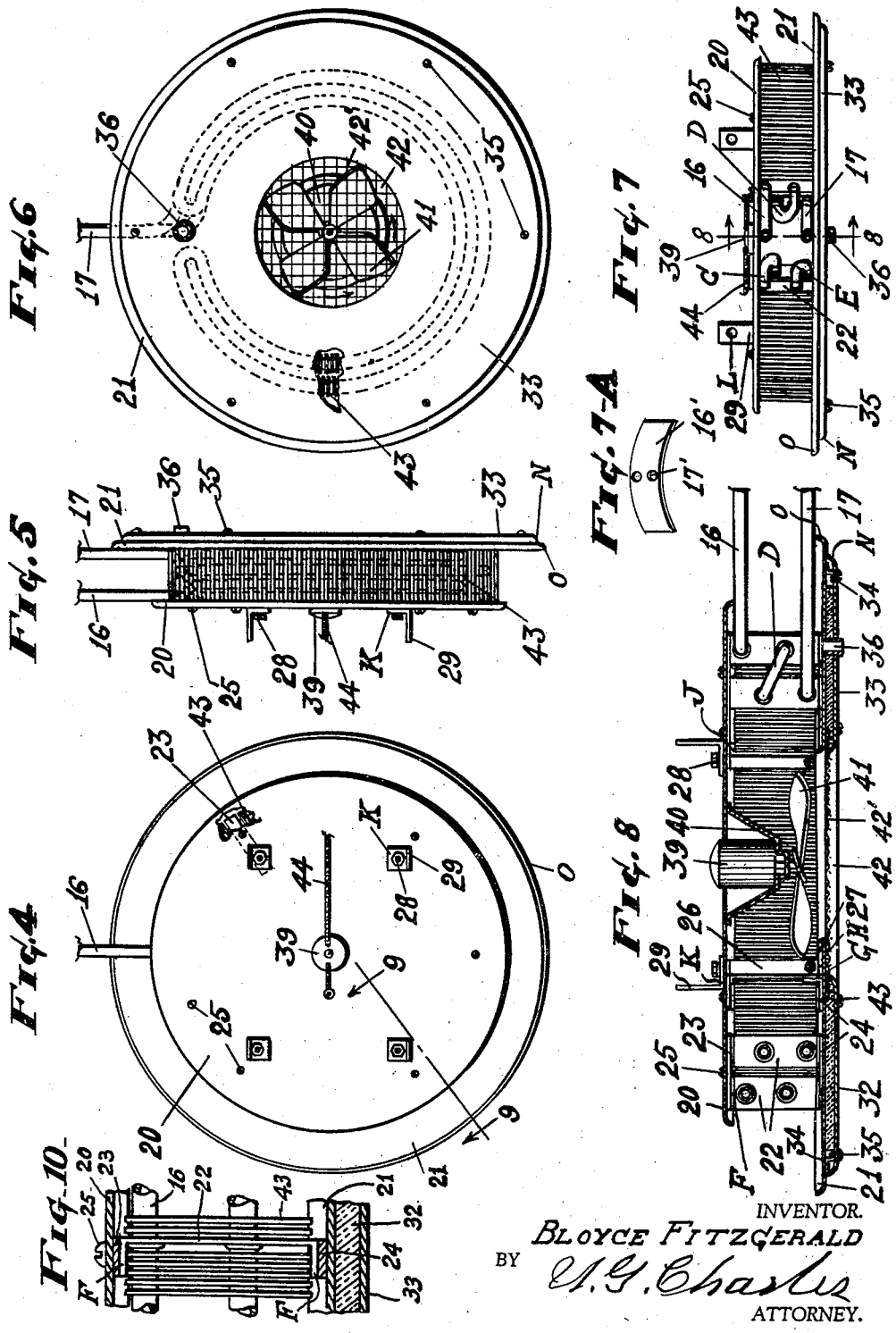
INVENTOR.
BLOYCE FITZGERALD
BY
ATTORNEY.

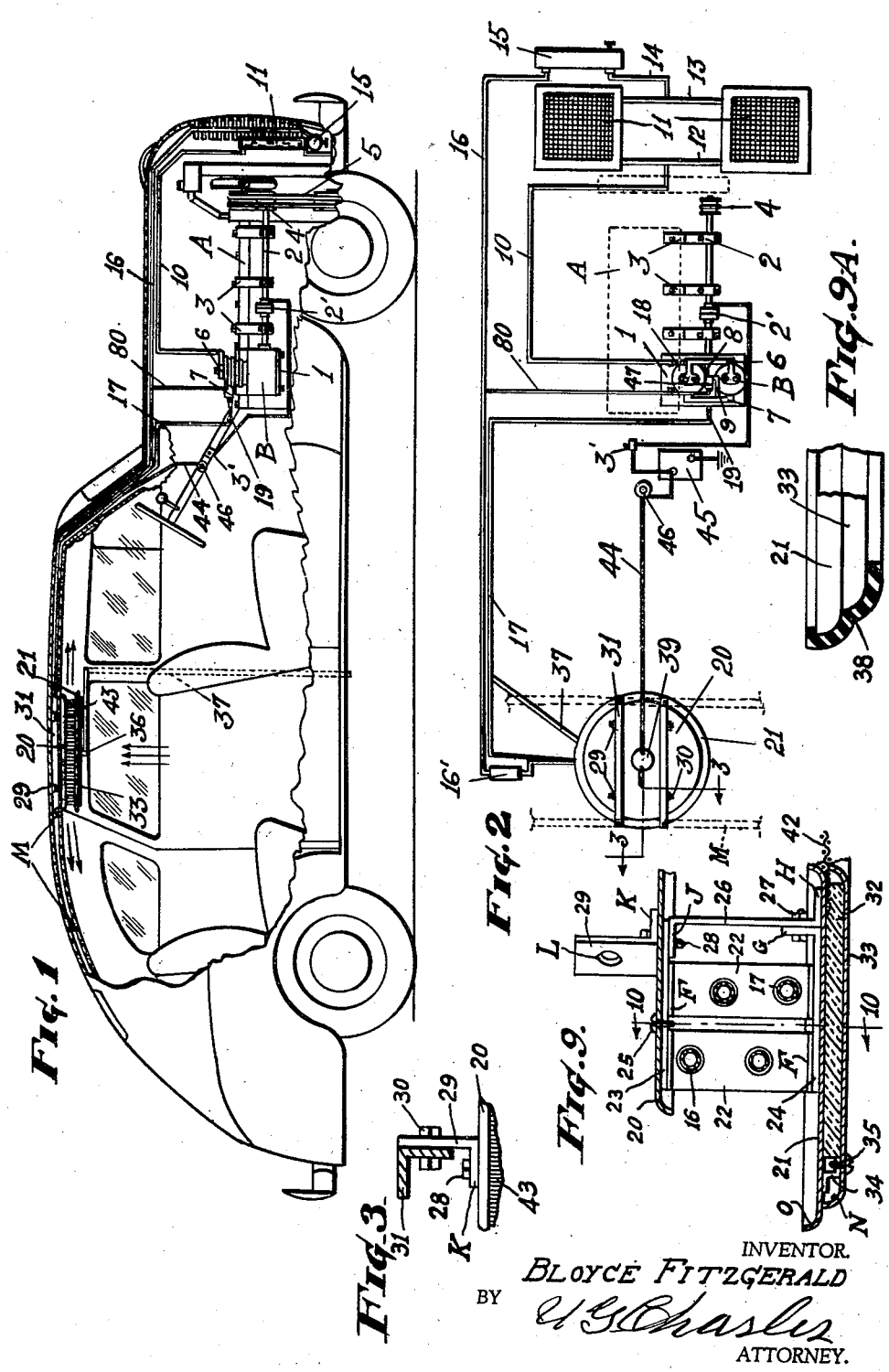

Patented Dec. 16, 1941

2,266,187

UNITED STATES PATENT OFFICE 2,266,187

DEVICE FOR AIR CONDITIONING AUTOMOTIVE VEHICLES

Bloyce Fitzgerald, Wichita, Kans., assignor of fifteen per cent to R. M. Kenney, twenty-five per cent to W. T. Crosswhite, twenty-five per cent to G. C. Boling and ten per cent to J. R. McLellan, all of Wichita, Kans.

Application January 29, 1940, Serial No. 316,161

4 Claims. (Cl. 62—140)

This invention relates to improvements in a mechanical device for refrigerating the passenger compartment of a motor-driven vehicle, and more particularly to the evaporator (or cooling coil) and has for its principal object to position the evaporator at the ceiling line of the vehicle to circulate the frigid air radially and uniformly from the evaporator.

A further object of this invention is to construct a refrigerating mechanism that may be installed in the present make and design of automobiles without altering or impairing the appearance of the vehicle body.

A still further object of this invention is to provide in the construction of the evaporator, a series of coiled tubes vertically assembled in such a way that the convolutions of the coils are in staggered relation, and a series of transversely positioned fins through which the tubes extend that are likewise in staggered relation on the coil and uniformly spaced therearound, whereby diffusion of the air current as ejected radially through the evaporator is accomplished, the current being produced by a motor-driven fan.

These and other objects will hereinafter be more fully explained, reference being had to the accompanying drawings forming a part of this specification, in which like characters will apply to like parts in the different views.

Referring to the drawings:

Fig. 1 is a view of the refrigerating system installed in a vehicle, parts thereof being broken away for convenience of illustration.

Fig. 2 is a diagrammatic view of the refrigerating system, the top framing, motor and radiator of the vehicle being shown by dotted lines, the condensers being turned on a horizontal plane for convenience of illustration.

Fig. 3 is a sectional view taken on line 3—3 in Fig. 2, illustrating the method of support for the evaporator.

Fig. 4 is an enlarged upper plan view of the evaporator.

Fig. 5 is an edge view of Fig. 4.

Fig. 6 is a lower or inverted plan view of the evaporator.

Fig. 7 is an edge view of the evaporator, looking in alignment with the inlet and outlet pipes, the inclosure plate for the pipe connections being omitted.

Fig. 7—A is a perspective view of the inclosure plate, showing the pipe apertures.

Fig. 8 is an enlarged sectional view through the evaporator taken on line 8—8 in Fig. 7.

Fig. 9 is an enlarged sectional view of the evaporator fragmentarily taken on line 9—9 in Fig. 4.

Fig. 9—A is a sectional view of a peripheral guard for the evaporator pan.

Fig. 10 is a sectional view taken on line 10—10 in Fig. 9 including a plurality of fins carried on the evaporator tubes.

This invention consists of an evaporator (or cooling coil) later more fully described, and to render the coil operative it will be seen that the component elements in their consecutive order with respect to function consisting of a compressor and a power hook-up from the vehicle motor to the compressor, a pair of condensers, a receiving tank for the refrigerant, said evaporator and control valve positioned within working relation to the evaporator, a by-pass valve, and a pipe system connecting all of said elements in working relation to each other.

The following is a detailed description of the elements above referred to, setting out their co-action. Figs. 1 and 2 show a preferred position of a compressor secured to the vehicle motor A by a suitable bracket 1, and a power transmitting shaft 2, likewise secured to the motor by suitable bearings 3, in which said shaft is trunnioned, said shaft having rigidly secured on its forward end a plurality of sheave pulleys 4 to be engaged by a like number of belts 5, the latter functioning as fan belts for the said vehicle motor, and said shaft being the transmitting medium of power to actuate a compressor B above referred to, said compressor being a conventional type for the service herein set forth, and to which the pipe lines are connected as hereinafter described. There is also a conventional type of magnetic clutch 2' in the power transmitting shaft to engage and disengage transmission of the power, and an electric switch 3' to make and break the electric current as connected with the clutch.

In Fig. 2 is illustrated a by-pass element 47 connected by pipes 8 and 9 to the discharge and suction lines, 6 and 7, respectively, of the compressor. The opening of the by-pass valve is controlled by condenser pressure through the medium of pipe 80 connecting the by-pass valve to the high pressure refrigerant line 16.

Extending from the said discharge pipe 6 is a pipe line 10 connecting to a pair of air-cooled condensers 11 through the medium of a pipe 12 that joins the condensers at their upper extremity, while the lower extremity of each is connected by a pipe 13 as a discharge through a pipe 14 into a receiving tank 15, the latter having an outlet pipe 16 extending toward and connected to the evaporator, and having in close proximity thereto a standard make of control valve to govern the flow of the refrigerant through the evaporator, said valve coacting with the by-pass structure for a predetermined temperature, said evaporator having a return pipe 17 extending forward and connecting to the said suction pipe 7 of the compressor, and each of said pipe lines 10 and 17 have a flexible connection 18 and 19 respectively, by which means vibration of the motor will not be transmitted through their respective pipe lines.

Positioned in the body of the vehicle and being secured to the ceiling is an evaporator, functioning as the cooling element, consisting of an upper plate 20 and a lower plate 21, said plates being circular in form, and between which is positioned circular pipes arranged as follows: Pipe 16 enters the structure, extending therearound and terminating with a U-bend C in close proximity to where it enters as shown in Figs. 6 and 7, and from thence returning in parallelism to the place of entrance but on a lower plane, terminating with a U-bend D and retracting to another termination at U-bend E and from thence retracting in parallelism and extending outward as pipe 17 which returns to the suction pipe of the compressor.

In Fig. 7 is shown an open space between the said U-bends and through which the said pipes 16 and 17 protrude, said opening being closed by an arcuate segment 16' having apertures 17' through which said pipes 16 and 17 extend, frictionally or otherwise, retaining the plate in a close position.

It will be understood that each U-bend slants from a horizontal plane to position the coil convolutions thus made in staggered relation horizontally, and being maintained in such position by supporting bars 22 placed at intervals around the coils and being apertured to space the coil convolutions apart vertically, that is to say the convolution of one coil and a corresponding one of another coil as shown in Figs. 8 and 9. The said bars 22 at each end have a right angle bend F to seat on bars 23 and 24 respectively, said bars being secured to their respective upper and lower plates 20 and 21 and positioned radially at intervals around said circular plates, the upper bar 23 being secured to its respective plate by screws 25 as shown in Fig. 4, while the bottom bar 24 has a right angle bent portion as at G to seat against a vertically disposed separator 26 and secured by bolts 27, the lower ends of said separators having a right angle bent portion H and being welded to the lower plate, while the upper end thereof has an oppositely disposed right angle bent portion J to seat on the inner end of the upper bar 23 and removably secured by a bolt 28 that extends through the leg K of a hanger 29, said hanger being apertured as at L, through which a bolt 30 engages, and through the leg of an angle bar 31, extending from one frame member M to the other of the top structure of the vehicle body. It will be seen that the lower circular plate 21 has a temperature insulation 32 to cover the lower area thereof and being supported and covered by a plate 33, last said plate having a peripherally upturned edge N where it leaves the insulation, engaging snugly with the underside of the plate 21, and being spaced from the peripheral edge of said insulation, whereby an open space is provided in which to place Z-shaped brackets 34 spaced therearound, one leg of each bracket being welded to the one side of said plate 21, while the other leg is attached to the side plate 33 by screws 35. Being so constructed, external condensation on the lower plate 21 will be avoided, and the said plate 21 has a peripheral upturned edge O as a container for condensation from the coil, there being a suitable nipple 36 downwardly extending as a drain, and to which tubing 37 will snugly engage, said tubing being a downspout to discharge external of the interior of the body, similar to that shown in Fig. 1.

In Fig. 9—A is shown an annular flexible guard 38 to frictionally engage on the peripheral extensions of said plates 21 and 33 to function as an emerging cushion.

Centrally positioned in the evaporator is an electric motor-driven fan, the motor 39 of which extends through the upper plate 20 as a bracing feature, while the lower end is secured by a conical shell 40 with sufficient depth to receive the length of the motor, the shell having a head at its lower frustum end on which the motor will seat, said head being axially bored, through which the motor shaft will extend, the said shaft having secured thereto a fan element, the wing members 41 of which are horizontally disposed to span a funneled opening 42 through the lower plate structures, said opening having a screen 42' to guard the fan blades, said fan being adapted to eject air current upward and outward through the structure as indicated by arrows in Fig. 1, by which arrangement a direct blast of the air current upon the occupants of the vehicle is avoided, and furthermore the current is radially dispensed on a horizontal plane as thorough mixing means for the unconditioned air in the vehicle body.

To create a thorough diffusion of the air passing through the evaporator, note in Fig. 8 that the convolutions of the pipes are in staggered relation, each being in a direct path of the air current. Furthermore, a series of fins 43, apertured to closely engage on the pipe convolutions and being radially positioned, will function as an additional cooling surface transmitted by the coils therethrough, and as further diffusing means for the air blast radially from the evaporator.

The motor of the fan has an electric power line 44 connected thereto, extending to a source of an electric source of power 45 carried by the vehicle, there being an appropriate switch 46 accessible to the driver of the vehicle to make and break the circuit for the fan, and the said switch being equipped with a rheostat as an emergency control for the speed of the fan, it being understood that the motor is properly grounded to the structure of the evaporator, which, in turn, is grounded with the chassis of the vehicle.

The invention herein described will operate as follows: The compressor is actuated, as heretofore described, by the motor of the vehicle optionally, the compressor transforming its refrigerant from a low pressure to a high pressure consistency. The high pressure is conducted by its respective pipe system through the air-cooled condensers where the high pressure gas or refrigerant is transformed into a liquid and from thence to a receiving tank, transmitting the liquid through pipe conductor 16 toward an evaporator or cooling coil, passing through a control valve in said pipe for a predetermined quantity flow uniformly into said evaporator, transforming the liquid into a low pressure refrigerant producing a low degree of temperature within and about the mechanism of the evaporator, the air circulation being dispensed therefrom by a motor-driven fan heretofore described. The refrigerant is returned from the evaporator to the suction side of the compressor through pipe 17 for a repeated action.

While there is shown certain modifications, it will be understood that other features may be modified as lie within the scope of the appended claims.

Having fully described the invention what is thought new and desired to be secured by Letters Patent is:

1. In an evaporator for a refrigerating system of the class described, an upper and a lower plate, said lower plate having an opening axially therethrough, a plurality of pipe coils wound about the said opening and being positioned in staggered relation with respect to cross section, means to secure the pipe coils in spaced relation with each other and between the upper and lower plates, a plurality of apertured fin elements to engage on the coils of the pipes assisting radiation of air current radially over said coils, an electric motor fan positioned in the opening of the coils and plate, means to secure the fan motor therein to create an air current through the opening of the plate and radially over said coils, a source of electric power to actuate said fan motor, and a switch to control the current to said motor, a temperature insulation, a plate and means to position the insulation on the lower side of the lower plate to avoid condensation external on said lower plate, said lower plate having an upturned edge to contain condensation from the coil, means to drain the condensation from said plate, and a screen element positioned between said insulation and lower plate and over the opening of said plate, all as and for the purpose specified.

2. In an evaporator for a refrigerating system of the class described, an upper and a lower plate, said lower plate having an opening axially therethrough, means to secure said upper plate to a top structure of a vehicle body, a plurality of pipe coils wound about the said opening and being positioned in staggered relation with respect to cross section, means to secure the pipe coils in spaced relation with each other and between the upper and lower plates, a plurality of apertured fin elements to engage on the coils of the pipes assisting radiation of air current radially over said coils, an electric motor fan positioned in the opening of the coils and plate, means to secure the fan motor therein to create an air current through the opening of the plate and radially over said coils, a source of electric power to actuate said fan motor, and a switch to control the current to said motor, a temperature insulation, a plate and means to position the insulation on the lower side of the lower plate to avoid condensation external on said lower plate, said lower plate having an upturned edge to contain condensation from the coil, means to drain the condensation from said plate, and a screen element positioned between said insulation and lower plate and over the opening of said plate, all as and for the purpose specified.

3. In an evaporator for a refrigerating system of the class described, an upper and a lower plate, a plurality of hangers upwardly extending from said upper plate as means to secure the plate to a top structure of a vehicle body, said lower plate having an openng axially therethrough, a plurality of pipe coils wound about the said opening and being positioned in staggered relation with respect to cross section, means to secure the pipe coils in spaced relation with each other and between the upper and lower plates, a plurality of apertured fin elements to engage on the coils of the pipes assisting radiation of air current radially over said coils, an electric motor fan positioned in the opening of the coils and plate, means to secure the fan motor therein to create an air current through the opening of the plate and radially over said coils, a source of electric power to actuate said fan motor, and a switch to control the current to said motor, a temperature insulation, a plate and means to position the insulation on the lower side of the lower plate to avoid condensation external on said lower plate, said lower plate having an upturned edge to contain condensation from the coil, means to drain the condensation from said plate, and a screen element positioned between said insulation and lower plate and over the opening of said plate, all as and for the purpose specified.

4. In an evaporator for a refrigerating system of the class described, as recited in claim 1, an annular flexible guard to enclose the peripheral edges of said lower plate structure.

BLOYCE FITZGERALD.